P. STUMPF & J. SCHROEDER.
CONTROLLING DEVICE FOR FLYING MACHINES.
APPLICATION FILED JUNE 1, 1912.

1,061,701.

Patented May 13, 1913.

2 SHEETS—SHEET 1.

Witnesses:

Inventors,
Paul Stumpf,
Josef Schroeder,
by
Att'y.

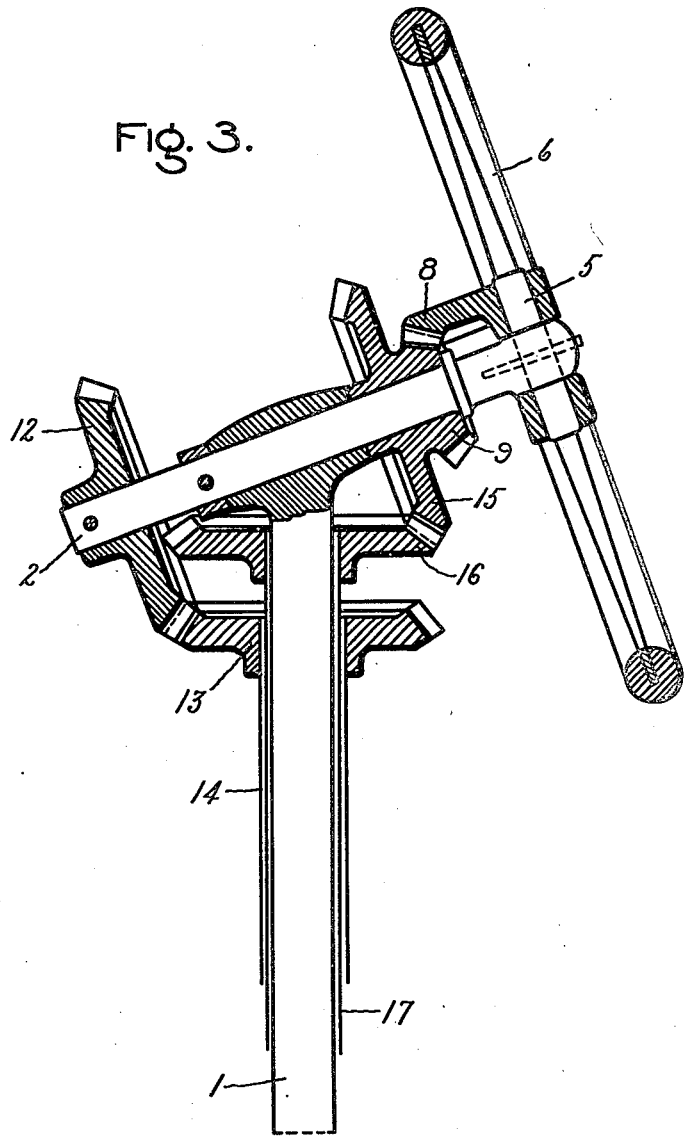

UNITED STATES PATENT OFFICE.

PAUL STUMPF AND JOSEF SCHROEDER, OF BERLIN, GERMANY, ASSIGNORS TO GENERAL ELECTRIC COMPANY, A CORPORATION OF NEW YORK.

CONTROLLING DEVICE FOR FLYING-MACHINES.

1,061,701.   Specification of Letters Patent.   Patented May 13, 1913.

Application filed June 1, 1912. Serial No. 700,938.

*To all whom it may concern:*

Be it known that we, PAUL STUMPF and JOSEF SCHROEDER, subjects of the King of Prussia, residing at Berlin, Germany, have invented certain new and useful Improvements in Controlling Devices for Flying-Machines, of which the following is a specification.

This invention relates to flying machines, and especially to heavier-than-air machines or aeroplanes.

The object of the invention is to increase the capacity of the machine to meet variations in the currents of the air encountered, and also to facilitate the steering. When curves are to be made in a lateral direction, the aviator usually employs a rudder turning on a vertical axis. At such times, also, the machine is usually tilted on a fore and aft axis, so as to stand obliquely as it rounds the curve. This effect is frequently produced by drawing down the tip or edge of the wing or plane on the inside of the curve. This operation is also necessary to meet any tendency of the machine to roll on its longitudinal axis when in straight flight. But such operation requires also that the rudder shall be turned in order to counteract the tendency of the machine to curve from the line of flight when one of the wing tips is flexed. It is therefore imperative that the two control devices shall be so connected as to operate simultaneously and yet leave the rudder free for independent operation when slight lateral curving only is desired.

Our invention aims to provide a simple and effective device for accomplishing this combined control.

Figure 1:
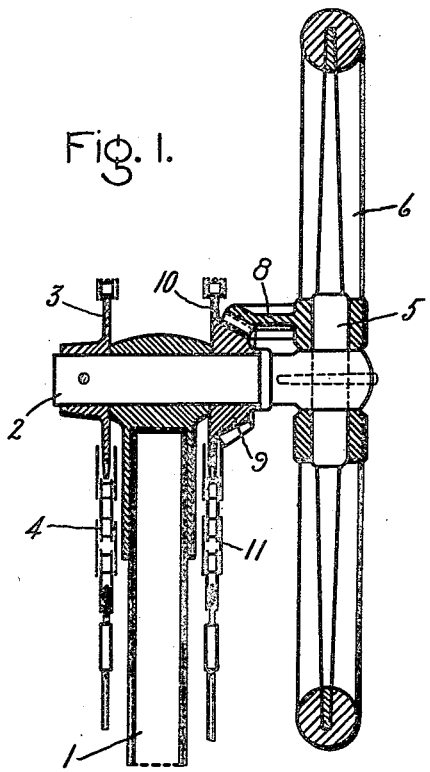
Figure 2:
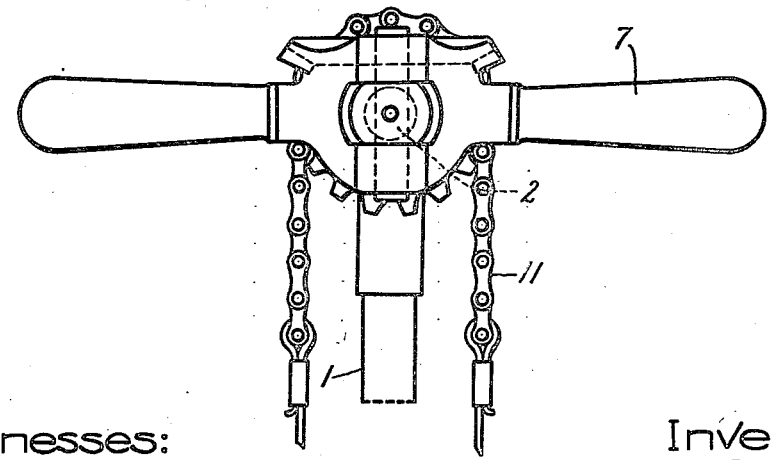

In the accompanying drawing, Figure 1 is a sectional elevation of one form of mechanism for carrying out our invention; Fig. 2 is a front elevation of a modified form of the same; and Fig. 3 is a sectional elevation of still another modification.

In Figs. 1 and 2 the head of the pillar 1 forms a bearing for a shaft 2 whose axis is in a fore and aft direction. On one end of said shaft is fixed a sprocket wheel 3 or other movement-imparting element, which through a tension element, such as a chain belt 4, actuates the oblique-control devices. On the other end of the shaft is secured an upright transverse shaft 5 on which is journaled the hub of a hand wheel 6 (Fig. 1) or a lever 7 (Fig. 2). Such wheel or lever is therefore capable of being turned on a vertical axis independently of the shaft 2 and yet if rotated in its own plane it will cause the shaft 2 to be rotated. Secured to the hub of the wheel or lever concentric with the axis of the transverse shaft 5 is a beveled segment gear 8 which meshes with a bevel gear 9 loosely sleeved on the shaft 2 and carrying sprocket teeth 10 or other movement-imparting element, which is connected by suitable tension elements, such as the chain belt 11, with the lateral-control device, or rudder. By rotating the wheel or lever on the transverse shaft 5 the gears will cause an actuation of the rudder without affecting the oblique-control devices. On the other hand, if the hand wheel or lever is rotated in its own plane, it will effect a movement not only of the rudder but also of the oblique-control devices, through the rotation of the shaft 2.

In Fig. 3, the rotation of the shaft 2 is transmitted to the oblique-control devices through the bevel gears 12, 13 and the sleeve 14 on the pillar 1, while the movement of the bevel gears 8 and 9 is transmitted to the rudder or the like through the bevel gears 15, 16 and the sleeve 17 on said pillar.

While we have described this invention as applied to a flying machine, yet it is evident that its use is not confined to that class of machines alone, but that it can be employed in a variety of connections where a combined and independent control of two separate devices is desired.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent of the United States, is,—

1. A controlling device, consisting of a main shaft rotatable on a given axis, an actuating device therefor, connections between said shaft and actuating device permitting a rotation of the latter on an axis transverse to said shaft, elements responding to a rotation of said actuating device on either axis, whereby said elements can be actuated either without causing a rotation of said main shaft or simultaneously therewith, and elements adapted to respond only to a rotation of said main shaft when said actuating device is operated to effect such rotation.

2. A controlling device consisting of a rotatable shaft, a shaft secured thereon transverse thereto, an actuating device journaled on said transverse shaft, a movement-imparting element secured on said rotatable shaft, another movement imparting element mounted to rotate on said shaft, and operative connections between said second element and the actuating device, whereby the rotation of said device on the transverse shaft will actuate said second element only, and the rotation of the rotatable shaft by said device will actuate both movement-imparting elements.

3. A controlling device consisting of a rotatable shaft, a sprocket wheel secured thereto, a shaft mounted on said rotatable shaft and transverse thereto, an actuating device journaled on said transverse shaft, a sprocket wheel sleeved loosely on said rotatable shaft, and bevel gears connecting said latter sprocket wheel and the actuating device.

In witness whereof, we have hereunto set our hands this 15 day of May, 1912.

PAUL STUMPF.
JOSEF SCHROEDER.

Witnesses:
RICHARD SCHWINN,
ROB. SCHMID.